May 3, 1966　　　J. C. NEEDHAM　　　3,249,735
ARC WELDING SYSTEMS

Filed July 29, 1963　　　3 Sheets-Sheet 1

Inventor
JAMES CHRISTOPHER NEEDHAM
By
Kenway Palmer, Stewart & Estabrook
Attorney May 3, 1966  J. C. NEEDHAM  3,249,735
ARC WELDING SYSTEMS
Filed July 29, 1963  3 Sheets-Sheet 3

Inventor

By

Attorney

United States Patent Office 3,249,735
Patented May 3, 1966

3,249,735
ARC WELDING SYSTEMS
James Christopher Needham, Saffron Walden, England, assignor to The British Welding Research Association, Cambridge, England
Filed July 29, 1963, Ser. No. 298,223
Claims priority, application Great Britain, Aug. 1, 1962, 29,596/62
26 Claims. (Cl. 219—131)

Many properties of electric arcs or discharges do not change linearly with the size of the arc current but on the contrary appear or make themselves felt only when this size exceeds some value. The present invention is concerned with a method and equipment for making such properties appear or for bringing them into play when it is impossible, difficult or undesirable to keep the size of the arc current above the value mentioned, or alternatively for effecting a control over the property when it is possible, convenient and desirable to keep the size of the arc current above this value.

A principal example of such properties is the property of an arc, in an arc-welding process employing a consumable electrode, of causing transfer to the work being welded of melted electrode material in the form of a so-called projected spray transfer of small droplets which give a sound deposit and make a good weld. This property disappears when the current size falls below a particular value for then, instead of the melted material being transferred as a spray which is projected by the arc as a rapid stream of small droplets passing under free flight or substantially free flight conditions from the consumable electrode to the work, the melted electrode material forms a large globule before any major transfer at all takes place, a series of such large globules providing a coarse deposit and tending as a consequence to make a poor weld. This is not the only drawback, however, for the transfer itself is not affected by the arc (since the arc contributes substantially nothing to the mechanism of transfer) but is brought about either by gravity or by the globule and the work coming together. In either case, the work is disposed beneath the consumable electrode and this is an undesirable limitation at times.

It will be appreciated that the value of arc current above which satisfactory welds are obtained and below which unsatisfactory ones are obtained is not a single exact value since there is a range of current sizes producing welds of moderate quality.

One specific example of a welding process exhibiting the above phenomena is that employing a $\frac{1}{16}$ inch diameter consumable aluminium electrode sheathed in argon and employing a D.C. arc. A good weld is obtained for currents above 150 amperes, and moderately good welds down to about 140 amperes (the electrode feed rate being reduced correspondingly). Below this, and at a feed rate of about 120 inches per minute, a discontinuity is found in which a new relationship exists between current and burn off rate of the consumable electrode and at which the current changes from about 140 to 100 amperes. This transition is accompanied by a roughly tenfold fall in the frequency of transfer and hence a corresponding increase in the transfer size, the transfer below the discontinuity (the so-called sub-threshold range) being in the form of comparatively large globules up to $\frac{1}{4}$ inch in diameter, being the equivalent of about 2 inches length of the aluminium electrode. Some improvement can be obtained by reducing the diameter of the electrode, but this necessitates increasing the electrode feed rate for any given current.

Because hitherto large currents, above the discontinuity level, have been maintained to effect the projected spray transfer it has not been possible to weld satisfactorily thin material. A further drawback to prior methods of welding satisfactorily thick material is that, even above the discontinuity, the projected spray transfer does not always lead to consistent results, nor is any given weld as regular as is desirable.

The first example of an arc property, given above, is that of causing a spray transfer. A second is that of cutting. Cutting a workpiece can be performed only when the current size is above some value, for below this value the material which is melted by the arc remains in the position on the workpiece where it solidifies on cooling, whereas above this value this melted material is blasted away from the workpiece.

The basic principle of the present invention is that the arc should be worked cyclically on at least two different cyclically recurring levels, a term explained later. An electric arc equipment according to this invention has an electric power supply system for supplying electric power to the electrodes (which in the case of the welding operation referred to previously are constituted by the consumable electrode and by the work respectively), this system including an electric power source arranged to supply electric power to the electrodes and including means which either presents an impedance which determines the power supplied to the electrodes or has a second electric power source arranged to supply electric power to the electrodes, the means being arranged to operate, otherwise than under the control of the arc, in a cyclic fashion to cause the arc to work on at least two different cyclically recurring levels.

The two levels referred to are, for convenience, referred to as the lower or background level and the higher or enhanced level. When the equipment is a wholly D.C. equipment, the enhanced level is simply at a higher D.C. level than the background D.C. level, and no further explanation of these terms is necessary. However, when the equipment is either wholly or partly an A.C. equipment, providing both background and enhanced currents which are already fluctuating cyclically or rhythmically, then operation at more than one level implies that, for the enhanced level, the amplitude of the main harmonic component of this level (i.e. the magnitude of the maximum instantaneous value of this component irrespective of sign) is greater than the amplitude of the main harmonic component of the background level. For equipments which are partly A.C. and partly D.C. and which provide the arc with an alternating current with a D.C. component, the enhanced level is the magnitude of the instantaneous current when the alternating current has its peak value and the same polarity as the D.C. component, whilst the background level is the magnitude of the instantaneous current when the alternating current has its peak value and has an opposite polarity to the D.C. component.

By working the arc on at least two levels it becomes possible to make a property of the arc appear, or to make its presence felt by bringing it into effective play, without keeping the size of the arc current above the value hitherto thought necessary as long as the enhanced level is higher than this value, whilst the background level can be lower than this value. An economy in power is thus possible since lower average currents may be supplied. A second advantage is that the application of the enhanced level provides a control over the time at which the property appears or makes its presence felt. Indeed, this second advantage may be obtained without the first, if desired, for the background level may be kept above the value mentioned, and the enhanced level then simply controls the time of appearance of the property of interest.

Both the above two advantages are of particular relevance to arc welding with a consumable electrode.

Thus, firstly, the minimum operating current, i.e. the background level may be depressed well below the average current corresponding to the mean burn off rate for the electrode feed rate desired, being below the normal discontinuity level, whilst the enhanced level is above this average current and above the discontinuity level, so that the background level simply tends to melt the electrode material slowly to produce a large globule, but the enhanced level acts to effect a spray transfer of the melted material as small droplets before the material is able to drop off under gravity. It will be appreciated that the enhanced level may contribute something to the melting and likewise that the background level may contribute something to the transfer in particular circumstances, but fundamentally the object is to have the melting brought about substantially completely by the background level and the transfer effected substantially completely by the enhanced level. The frequency of the transfer is thus directly related to the frequency of occurrence of the enhanced levels, whilst the average value of the material transferred is determined by this frequency and the burn off rate. The average current or power requied for the welding is thus reduced so that welding can now be performed using a wider range of current and power values than hitherto. This reduction in the current and power necessary permits the welding of thinner materials than has been possible before, and enables electrode feed rates and traverse rates to be reduced. Thus, for example, the average level (i.e. the average of both the enhanced and background levels) may be as low as 100 amperes for $\frac{1}{16}$ inch diameter aluminium electrodes, or even as low as 50 amperes for this size, and even less for thinner electrodes, the necessary enhanced level for the transfer being of course considerably higher than both this average level and the background level.

Secondly, by having the enhanced levels responsible for the electrode material transfer, a greater degree of control over the transfer is possible than hitherto, and a regular and frequent transfer becomes possible in practice without difficulty by applying the enhanced level cyclically and frequently. This particular advantage can, if desired, be obtained even when the background level is above the discontinuity level, a condition where projected spray transfer would occur even in the absence of the enhanced level, but not necessarily as regularly or as frequently as desired. For example with a direct current above the discontinuity level, the transfer may take place at a relatively low rate of well under 50 times per second but this can be increased to 50 times per second by employing the electric mains to given an enhanced level at this frequency.

Whether or not the background level is above the discontinuity level, the transfer is mainly effected by the enhanced level. The background level maintains an arc between the consumable electrode and the workpiece and melts the electrode and the cyclically recurring enhanced level transfers the melted material to the work being welded.

An arc-welding system operating in this way may be such as to operate with a so-called self-adjusting arc, i.e. a feeding mechanism is provided for the consumable electrode for feeding the latter to the work at a pre-set or normally constant rate, the electrode being burned away by the action of the arc so as to maintain a substantially constant arc length. Alternatively, however, the feeding mechanism may be controlled by the arc voltage through a servo mechanism, for example, so that an increase in the average arc voltage, above the equilibrium value, leads to an increase in the average feed rate of the electrode so as to restore equilibrium, as in automatic or controlled arc welding. Moreover, the electrode may have a thin wash coating with or without an extra gas shield, or a flux may be added, or the electrode be provided with a thicker flux covering in a like manner to manual metal-arc electrodes. The invention has particular utility in reducing current and burn-off rate in welding operations where the normal current density in the consumable electrode is relatively high, for example 50,000 amperes per square inch and/or the rate of burn off of the electrode is normally in excess of 100 inches per minute.

Equipment according to the invention may, however, be employed for other purposes, e.g. cutting, lighting or heating, where it is desired to obtain some property of the arc without keeping the arc current at a single level such as is required to make the property of interest appear. By working the arc at two or more levels, one is in fact able to obtain a mixture of arc properties normally associated with the different levels. With equipment for the above-mentioned purposes, neither of the two electrodes need be consumable, and the arc can be operated in an inert or non-inert gas atmosphere, e.g. air, either at atmospheric pressure or not. The invention can be employed for a cutting operation, where the background level effects melting and the enhanced level blasts the melted material away from the work, which is thereby cut.

Many different patterns for a cycle of operation are possible. For example, the background level may be a simple sinusoidal current waveform operating for only part of the cycle of the system whilst the enhanced level may be another simple sinusoidal current waveform of greater amplitude operating only for the rest of the cycle. In a second example, the background level is again a simple sinusoidal current waveform, but here this waveform is applied for the whole cycle, whilst at one or more times during this cycle the enhanced level is applied in the form of, for example, pulses exceeding in magnitude the amplitude of the background level and being applied less than, more than, or exactly, once for every waveform half cycle. In a further example, the background level is a D.C. level and the enhanced level is an alternating current which is intermittently and cyclically applied. In yet a further example, the background level is an alternating current level and the enhanced level is a D.C. level which is applied intermittently and cyclically.

The arc current in any one means cycle may have a pattern made up of one or more constant or D.C. background levels and one or more constant or D.C. enhanced levels with a rapid transition between levels, giving a rectangular waveform, which may have but need not have some distortions as compared with a purely geometric rectangular waveform shape. A further possibility is that the background level is a D.C. level, whilst the enhanced level is created by a triangularly shaped waveform superimposed on the top of the D.C. level, this waveform having either rapid or relatively slow rates of rise or fall with or without a relatively flat top. Instead of the triangularly shaped waveform, a single half cycle of a sine wave, either with or without a flat top, may be superimposed on top of the D.C. level.

Equipment according to the present invention should not be confused with equipment having auxiliary devices for stabilising or reigniting the arc. Such auxiliary devices are of two different types. The first type provides high-voltage high-frequency spark injection into the gap between the electrodes but the device itself does not supply power to the electrodes but acts to break down the gap so that power applied to the electrodes by another electric power source is able to create or keep going an arc. The second form of auxiliary device provides a uni-directional surge injection such as is described in United Kingdom Patent No. 705,164. This surge injection device is connected to supply power to the electrodes. The device, moreover, acts in a cyclic fashion, but it does so completely under the control of the arc, serving to provide an extremely short surge for every alternate half cycle of alternating arc voltage to maintain the arc and to prevent the inherent rectifying characteristics of the arc from coming into play. This can be contrasted with equipment according to the present invention where the means referred to operates independently of the arc and where, therefore, the different cyclically recurring levels do not have to be repeated at the same rate as the alternating current of the arc itself. Moreover, it can be said in general that whereas the removal of the surge injection device from prior equipment would cause the arc to extinguish either immediately or after a number of cycles, the removal of the enhanced level does not cause the arc to extinguish since it can be kept going merely by the background level although, as previously indicated, such an arc might not be particularly effective for any particular purpose, for example for effecting the projected spray transfer. A further distinction from surge injection devices is that the latter provide, as indicated, an extremely short surge, whereas the means of the present equipment is preferably arranged to operate in such a cyclic fashion as will cause the enhanced level to be maintained for a substantial period of the order of 1 millisecond, or upwards of 1 millisecond. The enhanced level can be cyclically repeated in any desired way and may, for example, be applied from 5 to 500 times a second. The selected frequency may, for example, be a simple multiple or sub-multiple of the frequency of the mains, the latter constituting the first electric power source for applying the background level, whilst the enhanced level is applied either several times for each cycle of the mains so that the cycle of the mains and that of the system are the same or, alternatively, the enhanced level may be applied only once for several cycles of the mains so that these several cycles constitute one cycle of the system.

A further distinguishing feature from the normal surge injection devices is that the average of the enhanced level is appreciable, and is, generally speaking, more than 5% of the average current of the background level (for alternating current arcs the average values quoted are the average rectified values).

The enhanced current controls the transfer of the material electrode as has been described, but it is necessary for an overall relationship between the average output, current and voltage to satisfy the requirements for equilibrium with the consumable electrode. Thus if the electrode is fed at a constant or pre-set rate then the power source should be substantially of the constant potential type so that variations in arc length (equivalent to changes in arc resistance) result in compensating changes in *average* current. Alternatively if the power supply is of appreciably higher effective open circuit voltage, compared with the arc voltage, then the supply approximates to the constant current type (albeit with the pulse waveform) and the electrode feed is to be adjusted to match the burn-off rate. This latter is usually accomplished by a simple servo system based on the arc voltage (indicative of arc length).

As previously indicated, the means for cyclically varying the arc current in an electric arc equipment may either have a second electric power source arranged to supply electric power to the electrodes or it may present an impedance which determines the power supplied to the electrodes. In either case, the cyclic operation may arise either by virtue of a cyclically operating switching device (which may be either a mechanical switching device or a thermionic valve or a semi-conductor, e.g. transistor switching device), or because of the inherent nature of the means itself. For example the means may be in the form of a second power source which is an alternating or pulse power source, or the means may present an impedance by being in the form of a rectifier or rectifying network which operates in a cyclic fashion by conducting current in one direction but not in the other.

In order that the several different aspects of the present invention may be more clearly understood, specific examples of a number of different systems illustrating the several aspects will now be described with reference to the accompanying drawings, in which.

Figure 1:
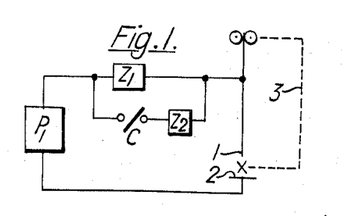
FIGURE 1 shows an arc-welding system having a single A.C. or D.C. power source.

In the arc-system shown in FIGURE 1 a single power source $P_1$ is connected in series with an impedance, $Z_1$, the power source and impedance being connected across the two electrodes 1 and 2 which, when the equipment is to be employed for arc welding, are in the form of a consumable electrode wire and the work respectively. Connected in parallel with the impedance $Z_1$ is a second impedance $Z_2$ in series with a switching device C which cyclically introduces the impedance $Z_2$ into the circuit to reduce the total impedance presented to current passing through the arc and thereby to raise the level at which the arc works. In this example, the wire 1 is a $\frac{1}{16}$ inch diameter aluminum wire which is fed at 100 inches a minute. The low current level is of the order of 50 amperes, whilst the enhanced current level is of the order of 200 amperes and is maintained for the order of 8 milliseconds at each operation of the switching device C, the cycle being repeated some fifty times per second.

The broken line 3 in FIGURE 1 is intended to indicate that in an arc-welding system having a consumable electrode 1, the consumable electrode 1 may be operated either to produce a self-adjusting arc with a pre-set electrode feed rate or as a so-called controlled arc in which the electrode feed rate is a variable which is governed by a servo motor responsive to the arc voltage. For the latter case, an approximately constant current supply at each level is desirable so that the operating currents are not greatly affected by changes in arc voltage or arc length. This is readily achieved by having the open circuit voltage, or the effective open circuit voltage of the power supply $P_1$ substantially greater than the voltage of the arc, for example three times the arc voltage or 50 volts in excess of the arc voltage. The effective open-circuit voltage of the power source $P_1$ is defined as the voltage intercept given by a straight line passing through the voltage/current working point and having the same slope as the output characteristic of the power source $P_1$ at that point. Alternatively, for self-adjusting arc operation it is desirable that the open circuit voltage or the effective open-circuit voltage of the power source $P_1$ be low and not much greater than that of the arc, as set forth in United Kingdom Patents Nos. 767,688 and 767,689. This condition applies mainly to the enhanced current period where, for good self-adjustment, the overall circuit impedance should be low compared with the arc so that the arc is the dominant factor in the control of circuit current. Thus, one method of operation is to employ a substantially constant potential power source with negligible limiting impedance (i.e. $Z_1$ and $Z_2$ present a low total impedance) for the enhanced current period, so as to provide means for self adjustment, and to increase the circuit impedance (when $Z_2$ is switched out by the switching device) to give the low or background current period where, as the burn off rate is correspondingly low, rapid self adjustment is less important.

In the example just given, the power source $P_1$ may be a D.C. source and the impedances can then be mainly resistive, although for the purposes of improving arc stability some circuit inductance may be conveniently added, particularly where the open circuit voltage is low. Alternatively, however, the power source P may be an A.C. source, in which case the impedances are usually mainly reactive. In this case, it is convenient for the switching device C to interrupt the current through the impedance $Z_2$ near or at the period of current zero. The switching device C may be a mechanical device with one or more breaks in series, or it may be an electrical or electronic apparatus such as a vacuum contactor, controllable gas discharge device or a semi conductor according to the requirements of particular applications. The switching device C can be operated at a simple multiple or a sub-multiple of the frequency of the power supply $P_1$ or it may be operated at or near this frequency, as would be the case when the switching device is in the form of a rotary mechanical commutator driven by an induction motor supplied by the power source.

Again, to aid arc stability and particularly the reignition with alternating current supply, well-known auxiliary devices, such as provide high-voltage high-frequency spark injection or surge injection as described in United Kingdom Patent No. 705,164 may be incorporated, according to the particular requirements of the consumable electrode arc employed.

As an alternative to the arrangement shown in FIGURE 1 an impedance is connected in parallel with the first power source across the electrodes, and a cylindrically operating switching device is connected in series with the impedance or in parallel with part thereof to enhance the current cyclically.

Figure 2:
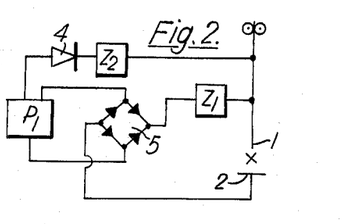
FIGURE 2 shows an arc-welding system similar to that shown in FIGURE 1 in which the power source supplies alternating current to parallel circuits via a full-wave rectifier bridge and a single phase rectifier, respectively.

In the system shown in FIGURE 2 the first power source $P_1$ is an alternating power source and is connected to the first electrode 1 through a rectifier 4 forming an impedance-presenting means. A double bridge rectifying network 5 forms a second impedance presenting means and is supplied by the first power source $P_1$ and connected to supply rectified current to the electrodes 1 and 2. The A.C. source $P_1$ may, for example, be the secondary winding of a transformer having one end connected through the rectifier 4 and an impedance $Z_2$ to the first electrode 1. The other end of the winding may be connected to the work not directly but through one of the four rectifiers of the double bridge rectifying network 5. With such an arrangement, the arc is provided on alternate cycles with pulses which, by making $Z_2$ sufficiently small, can be at a high or enhanced level. The double bridge rectifying network provides an output on every half cycle of the A.C. source, this rectified output being applied to the arc through an impedance $Z_1$ which can be made so large that the resultant current in the arc constitutes its background level. The rectifier 4 in series with the impedance $Z_2$ operates in a cyclic fashion by conducting only in alternate half cycles and this serves to ensure that the arc works in a cyclic fashion on two different levels.

Figure 3:
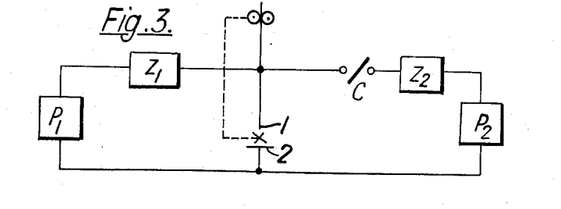
FIGURE 3 shows an arc-welding system including two A.C. or D.C. power sources connected in parallel across the arc electrodes.

FIGURE 3 shows a system according to the invention including a second power source $P_2$ which is arranged to operate in cyclic fashion by virtue of a cyclically operating switching device C arranged to connect the second power source to, and disconnect it from, the electrodes 1 and 2 so that the arc is alternately supplied by both sources and by the first source only. Each power source may be a D.C. or an A.C. source or a combination of both, and each may be connected in series with its own impedance Z and $Z_2$ respectively to the consumable electrode 1. As indicated by the broken line 3, the latter may be fed forwards to provide a controlled arc or a self adjusting arc as previously mentioned, and auxiliary means may be provided for stabilising or reigniting the arc if this is thought desirable. Convenient values for the circuit components of the FIGURE 3 system when the arc is arranged to be self-adjusting are that the first power source $P_1$ should be a 35 volt D.C. source and the first impedance $Z_1$ should be .3 ohm to give a background current of about 50 amps. The second power source $P_2$ could then have an output of 35 volts A.C. and the second impedance $Z_2$ a magnitude of .1 ohm to give an enhanced arc-current of about 200 amps. For controlled operation the voltage outputs of the first and second power sources $P_1$ and $P_2$ could be increased to about 100 volts D.C. and A.C. respectively and the values of the impedances also increased.

The first power source need not be permanently connected to the two electrodes in as in the example just given, for as an alternative the cyclically operating switching device may be arranged to connect the two power sources sequentially to the electrode so that only one source supplies the arc at a time.

Figure 4:
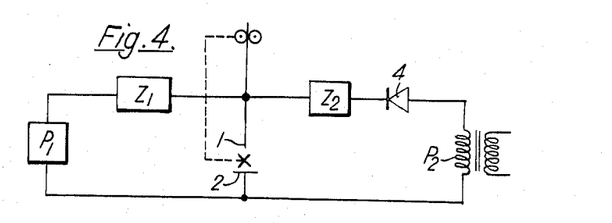
FIGURE 4 shows a system similar to that shown in FIGURE 1 in which the secondary winding of a transformer forms the second of the two power sources.

In a further example of a system embodying the invention shown in FIGURE 4, a second winding of a transformer forming a second power source $P_2$ is connected in parallel with the first power source $P_1$ across the electrodes 1 and 2 and operates cyclically by virtue of being an alternating or pulse power source. The first power source $P_1$ is a D.C. source connected through an impedance $Z_1$ across the electrodes, the impedance $Z_1$ being made up of a controlling resistance and a stabilising reactance. This first power source $P_1$ provides the background current, whereas the enhanced current is provided by an alternating source $P_2$ connected through a rectifier 4 and impedance $Z_2$ across the electrodes 1 and 2 in parallel with the first source $P_1$ and its impedance $Z_1$. With such an arrangement current flows from the winding $P_1$ only when the alternating E.M.F. exceeds that of the arc voltage and this occurs at the frequency of the power applied to the primary winding. For cyclic repetition of twice this frequency a full wave or bridge rectifier system may be used, or for a sub multiple of this frequency a switching device may be employed in series with the rectifier. This has the advantage that the switching device may be arranged to open only on no load, i.e. after the current has been stopped by the rectifying action. Alternatively, a controlled rectifying device such as a silicon controlled rectifier may be used and triggered appropriately in place of such a switching device and rectifier combination. For self adjusting arc operation, the circuit having the rectifier should have a low impedance and the peak of the alternating E.M.F. should exceed by a comparatively few volts the voltage across the arc due to the background current of the first source. Alternatively, however, for more definite control of the enhanced current a higher alternating E.M.F. and controlling impedance which can be mainly resistive may be used, and, if desired, the consumable electrode may be operated as a controlled arc system.

With the system just described the duration of the enhanced current is less than a half cycle, this being particularly noticeable when the peak of the alternating E.M.F. only just exceeds the arc voltage by a few volts. To obtain enhanced current durations greater than this and greater than a half cycle in particular, the alternating source can be pre-biassed by an additional D.C. source in series and in the same sense with respect to the arc as the first D.C. source. This second D.C. source may form part of or be combined with the first D.C. source.

In a modification, the first power source is an alternating source so that the arc works on an alternating background level with periodically enhanced current levels when the second alternating source comes into action.

The impedances referred to in the preceding examples need not be linear impedances but may be in the form of non-linear devices such as saturating iron-cored inductances, or a resistor with a varying voltage/current characteristic, and such devices may be particularly useful in order to accentuate the enhanced current level. For example, in one system according to the invention shown in FIGURE 5 a first power source $P_1$ and a first impedance $Z_1$ are arranged in series across the electrodes, whilst in parallel with these are arranged, in series with one another, a second, alternating power source $P_2$, a rectifier 4 and a non-linear (Metrosil, for example) impedance $Z_2$. This leads to some economy in power and a more distinctive peak in the enhanced current period than with the similar equipment previously described having a linear impedance.

Figure 6:
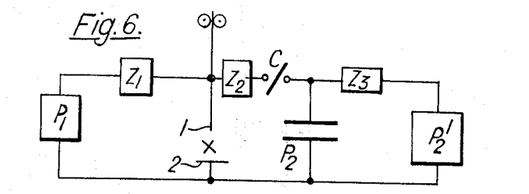
FIGURE 6 shows a modified arc-welding system including a capacitor forming the second power source.

In yet a further system according to the invention, shown in FIGURE 6 a first power source $P_1$ and impedance $Z_1$ are connected in series across the electrodes 1 and 2 as before. Connected also across the electrodes is a second power source $P_2$ in the form of a capacitor connected to the electrodes 1 and 2 through a switching device C and an impedance $Z_2$. The capacitor $P_2$ is charged through a further impedance $Z_3$ by a separate D.C. source $P_2{}^1$ and the enhanced level can be provided at any desired rate by operating the switching device C and thus discharging the capacitor through the circuit including the electrodes 1 and 2.

Figure 7:
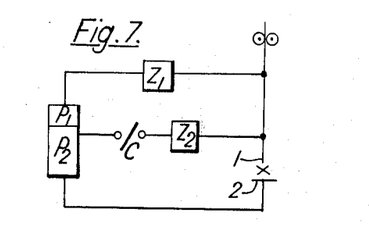
FIGURE 7 shows an alternative system including two power sources arranged in series.

When two power sources are provided they need not necessarily be connected in parallel with one another across the electrodes in the way shown in FIGURES 3–6. FIGURE 7 shows a system according to the invention in which the second power source $P_2$ is in series with the first power source $P_1$ and the electrodes 1 and 2 are arranged to operate cylically by virtue of being an alternating or pulse power source. The first power source $P_1$ may be a D.C. source or an A.C. source.

If desired, the arc may work on more than two differently cyclically recurring levels, in which case a further cyclically operating circuit is provided which is arranged to operate, otherwise than under the control of the arc, to cause the arc to work on the different required levels. For example in the system shown in FIGURE 8 a first power source $P_1$ and impedance $Z_1$ in series with it are connected across the electrodes to provide the background level. Also connected across the electrodes and in parallel with the first power source $P_1$ and its impedance $Z_1$ are, in series with one another, a second impedance $Z_2$, a rectifier 4, and a secondary winding of a transformer forming a second power source $P_2$. Also connected across the electrodes in parallel with the other two supplies are, in series with one another, a third impedance $Z_3$, a switching device C and a capacitor $P_3$, the latter being charged up through a further impedance $Z_4$ by a charging source $P_3{}^1$. The capacitor $P_3$ may provide short duration high energy impulses, which may be made to occur either during the enhanced current period during which the second power source $P_2$ is operative or during the time when the arc is working on the background level. This compound arrangement may be used, for example, when the combination of the background and the enhanced level due to the second power source leads to the formation of a suitable droplet on the tip of the consumable electrode, the detachment of the droplet being completed with the aid of the capacitor discharge.

Figure 9:
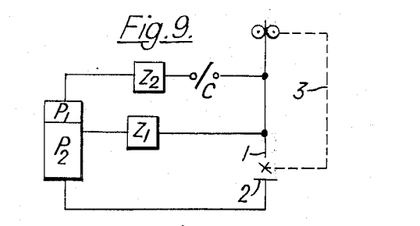
FIGURE 9 shows a system similar to that shown in FIGURE 7 but adapted to be particularly suitable for controlled arc operation with a consumable electrode.
Figure 10:
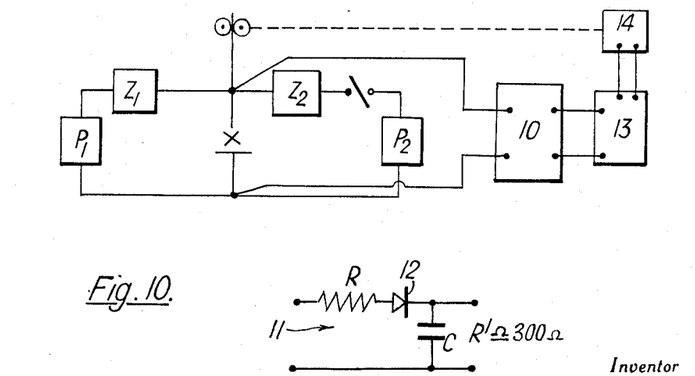
FIGURE 10 shows a modification of the system shown in FIGURE 9 including means for controlling the feed of the consumable electrode with reference to the enhanced current level.

In some equipments according to the invention, the means provided for cyclically varying the arc current may be regarded as a second power source or may be regarded as an impedance. Thus in one equipment, a power source P may be provided which has two separate tapping points to provide two different background levels. The power source may, for example, be the secondary winding of a transformer having different tapping points. This may be regarded either as a single power source with different tapping points or as two power sources having parts in common giving an arrangement similar to that shown in FIGURE 7. One tapping point may be connected directly to the consumable electrode through an impedance $Z_1$, whilst the other is connected to the same electrode through an impedance $Z_2$ and a switching device in series. The tapping point connected to the electrode through the impedance $Z_2$ provides the higher level. This level can be produced by taking a lower E.M.F. tapping point on the winding than that connected to the impedance $Z_1$ (the impedance $Z_2$ then being much smaller than $Z_1$). Alternatively, as illustrated in FIGURE 9 the higher level can be produced by taking a circuit from a higher E.M.F. tapping point, a second impedance $Z_2$ and a switching device C, than that which is connected to $Z_1$. The first alternative in FIGURE 7 is more appropriate to self-adjusting arc operations whereas the latter alternative in FIGURE 9 is more suitable for controlled arc operation. It should be noted that for the latter type of operation, although the electrode feed mechanism is normally based on the average or mean arc voltage, it may be preferable to use the average arc voltage selected from a part of the current sequence, particularly the period of the enhanced current level, during which the burn-off of the electrode is greater. A suitable system for achieving this is shown in FIGURE 10 for the D.C. arc, where on the input side of a discriminator 10 the resistance-capacity combination shown in the inset 11 has a time constant of the order of 2 milliseconds but by means of the rectifier 12 has a larger discharge time constant. These time constants permit the capacitor to charge substantially to the peak of the arc voltage during an enhanced current period while being insensitive to spurious voltage peaks such as those which occur at the instants of transfer. The rest of the system including the voltage controlled supply 13 for the driving motor 14 of the electrode feed rolls is as conventional practice.

As a further example of self-adjusting arc operation, numerical values of the components of the circuit of FIGURE 4 suitable for this type of operation will now be given. The first power source $P_1$ is a D.C. source (battery, generator, single phase or 3 phase transformer rectifier) of about 25 to 35 volts open circuit, the first impedance $Z_1$ is a resistance to limit background current to the order of 10–50 amp. with, if desired, a reactance of the order of 0.2 mh. to assist arc stability and reduce bypass of the pulse current into source $P_1$ (this consideration is not important in the case of rectifier supplies), the second power source $P_2$ is an A.C. source of about 25–35 volts open circuit with silicon diode rectifier 4 in series with it, and the second impedance $Z_2$ is a sufficiently low resistance with negligible reactance to permit pulse currents of the order of 100–300 amp. peak.

This system is suitable for pulse control of transfer for $\frac{1}{16}$ in. diameter aluminium in argon with burn-off rates of the order of 100 in. per min. For lower burn-off rates pulse frequencies of less than mains can be used, employing for example a simple rotary commutator to cut out unwanted pulses or preferably replacing the rectifier with a silicon controlled rectifier which can be triggered as desired.

For controlled arc operation where the electrode feed is made dependent on arc voltage, or in manual control as in stick electrode welding, the overall power source characteristics should approximate to constant (average)

current. For this higher effective open-circuit voltages and impedances are necessary. Thus in the above example the voltages are increased to around 50–75 for $P_1$ and $P_2$ (which can be one and the same source) with the appropriate circuit impedances to limit the currents to levels such as described earlier.

There is a practical point which applies to all the systems described which relates to starting the process. Although high voltage sparks (H.F. ionizer unit) could be used for arc striking there are several disadvantages including radio interference. Normally at high currents the process is initiated by allowing the electrode to strike the plate whereupon the short-circuit current (especially in the case of approximately constant voltage "flat characteristic" power sources) fuses the electrode and starts an arc.

Figure 11:
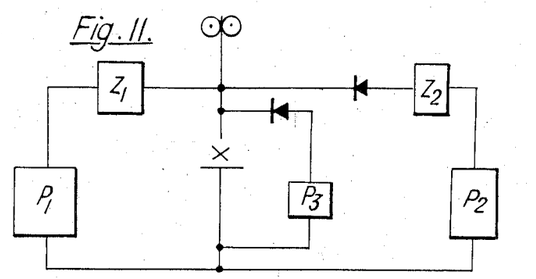
FIGURE 11 shows a system similar to that shown in FIGURE 3 including a starting circuit.

Under the conditions of pulse control of transfer initial fusing is often difficult since the *average* current available is by choice low, and in many instances the enhanced levels are too infrequent to be effective. To promote instant starting a low voltage short-circuit current supply is added to the systems described, with the current in the same sense as that used in the arc and supplied through a blocking rectifier, as shown in FIGURE 11. This short circuit current for fusing the electrode tip, only flows when initial contact is made between the electrode and the work, and is self cut-off when the arc is formed as the arc burning voltage (15 v. and upwards) is in excess of the starting current supply open-circuit voltage and the rectifier potential is reversed. Voltages of suitable starting supplies range between 8 and 12 v. and, with short-circuit currents of the order of 1000 a., the first point of contact fuses substantially instantaneously, generally in less than 1 millisec.

Figure 12:
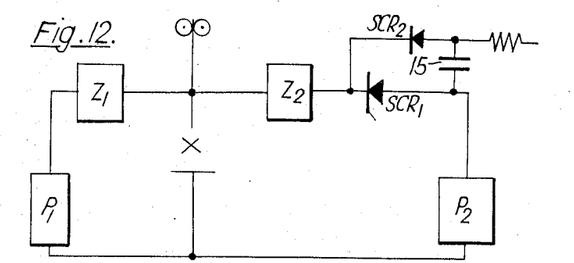
FIGURES 12 and 13 show modified systems including silicon controlled rectifiers.

Referring to the basic systems, shown in FIGURES 1, 3, 7 and 9, the switching device can consist of simply a normal rotary commutator with metal-loaded carbon brushes. Although this is practicable and allows any pulse duration and interval to be selected, there is some sparking (arcing) at the moment of break which results in brush and commutator wear. This can be successfully minimised by means of one or more of the following steps: use of low voltage supplies (as for self-adjusting arc operation) where the voltage difference between the power source and the welding arc is insufficient to support arcing at the commutator as well, by minimising circuit inductance in the enhanced current circuit, by adding arc suppressing circuits across the break points such as a parallel capacitor, by providing simultaneously more than one break in series and so forth. However, an alternative is to employ a switchable electronic device such as a silicon controlled rectifier. With an A.C. supply the silicon controlled rectifier can be triggered into conduction at any convenient point of the A.C. waveform (anode positive) and it self-extinguishes at the following voltage zero when the rectifier potential is reversed; but with a D.C. supply an artificial reverse potential must be applied to cut off the silicon controlled rectifier. Systems for this are well-known and one example is shown in FIGURE 12 where, with the main silicon controlled rectifier 1 already conducting to give the enhanced current, the auxiliary silicon controlled rectifier 2 is triggered to discharge the pre-charged capacitor 15 so as to reverse the primary silicon controlled rectifier 1 and cause it to cut-off.

Figure 5:
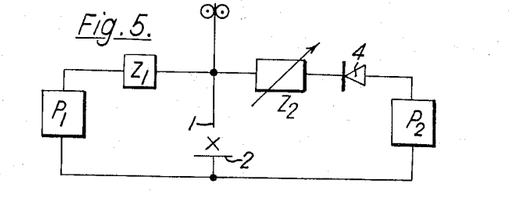
FIGURE 5 shows a system similar to that shown in FIGURES 3 and 4 in which the impedance in the parallel circuit for cyclically varying the arc-current is non-linear.
Figure 8:
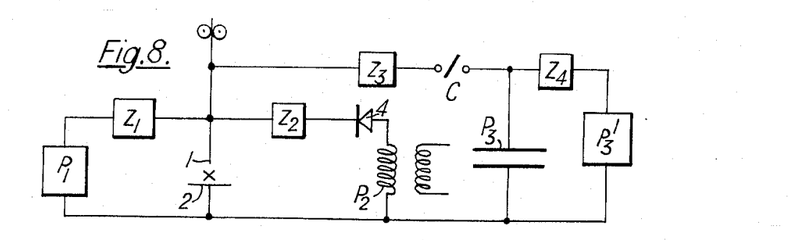
FIGURE 8 shows a system embodying an aspect of the invention including 3 power sources for working the arc on three different cyclically recurring levels.
Figure 13:
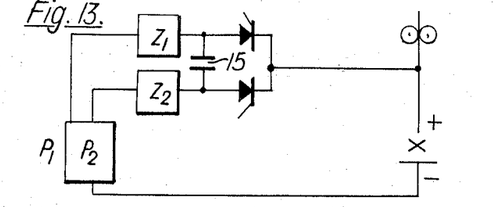

Yet another system employs two silicon controlled rectifiers which can conveniently supply the background and enhanced currents respectively while switching each other in turn on and off. A typical circuit for a D.C. supply is illustrated in FIGURE 13 where the cross coupling capacitor 15 is discharged by each silicon controlled rectifier in turn to cut off the other. This system is thus independent of the supply frequency (as distinct from examples such as shown in FIGURES 4, 5 and 8) and any convenient mark/space ratio of enhanced to background current duration and level can be selected. This system is particularly advantageous in that the frequency of the current pulses can be related to the burn-off rate or feed speed of the electrode. Thus with a given pulse amplitude to cause transfer of a certain quantity of metal from the electrode, if the feed rate is reduced a corresponding decrease in burn-off is achieved by decreasing the pulse frequency and hence also the average current (which must also match with the desired burn-off rate).

Figure 14:
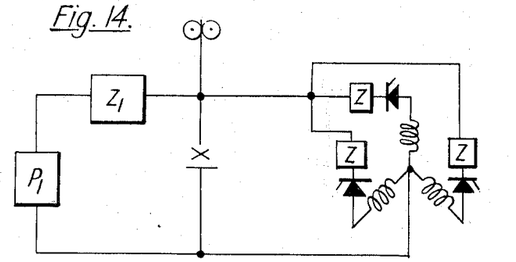
FIGURE 14 shows a system in which a multiphase supply constitutes the second power source.

However, with the simple A.C. source and controlled rectifier (or rectifier with commutator) a range of fixed frequencies can be derived using a three phase supply as shown in FIGURE 14. Thus with three phase half-wave the pulse frequency is 150 (for 50 c.p.s. supply) and by either reducing to single phase or eliminating certain half cycles or both various sub-frequencies of 100, 75, 50, 37½, 30 etc. are produced. The circuit impedance $Z_2$ can of course be common to the rectifiers or each effectively separate. Again the power source for the enhanced current supply can be considered as separate from or combined with the source of the background current.

Whenever a direct power source is required, this may be in the form of a battery, a generator, or a transformer rectifier set, whereas when an A.C. source is required an alternator or transformer may be employed.

I claim:

1. An arc system utilizing a non-linear effect of arc operation which occurs significantly only above a given arc current value, said system including a first electrode, a workpiece forming a second electrode separated from said first electrode by an arc space, a power source, a first impedance connected in series with the power source to provide in said arc space an arc-maintaining current lower than the said value, a further impedance, and a switching device connected in series with the said further impedance, the switching device being arranged to operate cyclically to connect the said further impedance in parallel with said first impedance, whereby the said arc-maintaining current flowing through the first impedance, when the switching device is not operated, is supplemented when the switching device is operated, by current flowing through the said further impedance to raise the total arc current higher than the said value, said switching device being in its operated condition for a period of each cycle such that the mean current value is closer to the lower current value than the higher current value.

2. An arc system according to claim 1 in which a source of direct current constitutes the said power source and in which the said first and further impedances are predominantly resistive.

3. An arc system according to claim 1 in which a source of alternating current constitutes the said power source and in which the switching device is arranged to operate at a frequency which has a simple integral relationship with the frequency of the said alternating power source.

4. An arc system utilizing a non-linear effect of arc operation which occurs significantly only above a given arc current value, said system including a first electrode, a workpiece forming a second electrode, a source of alternating current, a full wave rectifying bridge network, constituting a first impedance, connected to receive alternating current from the alternating current source and to supply rectified current to the first electrode and to the workpiece and a single phase rectifier, constituting a second impedance, also connected to receive alternating current from the alternating current source and connected to apply the resultant cyclically occurring rectified current pulses to the first electrode for cyclically increasing the current flowing between the first electrode and the workpiece to raise it from a first value below said given value to a second value above said given value.

5. An arc-welding system according to claim 4 in which the first electrode is a consumable electrode and the values of the components of the system are such that the effective open circuit voltage of the power source substantially corresponds with the arc-voltage between the consumable electrode and the workpiece, including means for feeding the consumable electrode towards the workpiece at a substantially constant rate independent of the said arc-voltage.

6. An arc-welding system according to claim 4 in which the first electrode is a consumable electrode and the values of the components of the system are such that the effective open circuit voltage of the power source is considerably greater than the voltage of the arc between the consumable electrode and the workpiece, including means responsive to the magnitude of the said arc-voltage for feeding the consumable electrode towards the workpiece at a rate which is dependent on the said arc-voltage.

7. An arc system utilizing a non-linear effect of arc operation which occurs significantly only above a given arc current value, said system including a first electrode, a workpiece forming a second electrode separated from said first electrode by an arc space, first and second power sources, first and second impedances, the first impedance being connected in series with the first power source to supply current for maintaining an arc between the first electrode and the workpiece, and a switching device operating cyclically for connecting the second power source between the workpiece and the first electrode via the second impedance for cyclically increasing the arc maintaining current supplied by the first power source to raise it from a first value below said given value to a second value above said given value.

8. An arc-welding system according to claim 7 in which the first electrode is a consumable electrode and the values of the components of the system are such that the effective open circuit voltages of the first and second power sources substantially correspond with the arc-voltage between the consumable electrode and the workpiece, including means for feeding the consumable electrode towards the workpiece at a substantially constant rate which is independent of the said arc-voltage.

9. An arc-welding system according to claim 7 in which the first electrode is a consumable electrode and the values of the components of the system are such that the effective open circuit voltages of the first and second power sources are considerably greater than the arc-voltage between the consumable electrode and the workpiece, including means responsive to the magnitude of the said arc-voltage for feeding the consumable electrode towards the workpiece at a rate which is dependent on the said arc-voltage.

10. An arc system according to claim 7 in which a source of direct current constitutes the first power source.

11. An arc system according to claim 7 in which a source of alternating current constitutes the second power source and in which a rectifier constitutes the switching device.

12. An arc system according to claim 7 in which a secondary winding of a transformer constitutes the second power source, a primary winding of the transformer being supplied with alternating current.

13. An arc system according to claim 7 in which a source of alternating current and a source of direct current together constitute the second power source and in which a rectifier constitutes the switching device, the source of direct current being so connected that it causes the current forming the arc between the first electrode and the workpiece to be increased cyclically for periods of longer duration than half the period of oscillation of the alternating source.

14. An arc system according to claim 11 in which the said second impedance through which current from the alternating current source is applied to the first electrode has non-linear characteristics whereby the peak values of the increased arc current flowing when the switching device is operated are accentuated.

15. An arc system according to claim 7 including a capacitor constituting the second power source and a source of direct current arranged to charge the capacitor which is discharged upon operation of the switching device to increase the arc current flowing between the first electrode and the workpiece.

16. An arc system utilizing a non-linear effect of arc operation which occurs significantly only above a given arc current value, said system including a first electrode, a workpiece forming a second electrode separated from said first electrode by an arc space, a first and a second power source, a first impedance connected in series with the first and second power sources, a further impedance, and a switching device connected in series with the said further impedance and the second power source, the switching device being arranged to operate cyclically to connect the said further impedance in parallel with the first impedance and the first power source, whereby current flowing through the first impedance to maintain an arc between the first electrode and the workpiece is increased when the switching device operates by current flowing through the said further impedance and thus is raised from a first value below said given value to a second value above said given value.

17. An arc system utilizing a non-linear effect of arc operation which occurs significantly only above a given arc current value, said system including a first electrode, a workpiece forming a second electrode separated from said first electrode by an arc space, first and second power sources, a first impedance connected in series with the first power source, a further impedance connected in series with the first and second power sources between the first electrode and the workpiece and, together with the second power source, in parallel with the first impedance, whereby the current flowing through the first impedance to maintain an arc between the first electrode and the workpiece is cyclically increased by cycles of current flowing through the said further impedance and thus raised from a first value below said given value to a second value above said given value.

18. An arc-welding system according to claim 17 in which the first electrode is consumable and the values of the components of the system are such that the effective open circuit voltage of the power sources is considerably greater than the arc-voltage between the consumable electrode and the workpiece, including means responsive to the magnitude of the said arc-voltage for feeding the consumable electrode towards the workpiece at a rate which is dependent on the said arc-voltage.

19. An arc welding system according to claim 16 in which the first electrode is a consumable electrode and the values of the components of the system are such that the effective open circuit voltage of the power sources substantially corresponds with the arc-voltage between the consumable electrode and the work piece, the system further including means for feeding the consumable electrode towards the workpiece at a substantially constant rate which is independent of the said arc-voltage.

20. An arc-welding system including a first consumable electrode, a workpiece forming a second electrode, a power source connected in series with the consumable electrode and workpiece for supplying current to maintain an arc between the consumable electrode and workpiece, means for cyclically increasing the arc-current flowing between the consumable electrode and workpiece to raise it to a level at which spray transfer of the consumable electrode to the workpiece occurs and means responsive to the increased voltage occurring cyclically between the consumable electrode and the workpiece for feeding the consumable electrode towards the workpiece at a rate which is dependent on the said increased arc-voltage.

21. An arc system utilizing a non-linear effect of arc operation which occurs significantly only above a given arc current value, said system including a first electrode, a workpiece forming a second electrode, a power source connected in series with the first electrode and the workpiece for supplying current to maintain an arc between the first electrode and the workpiece, means for cyclically increasing the arc-current flowing between the first electrode and the workpiece to raise it from a first value below said given value to a second value above said given value, a starting power source, having an open-circuit voltage lower than the arc voltage when the arc is established, connected through a rectifier to the electrodes, to supplement the supply from the first power source in starting the arc between the first electrode and the workpiece, said rectifier cutting off said starting power source when the arc voltage exceeds the voltage of said starting source.

22. An arc system utilizing a non-linear effect of arc operation which occurs significantly only above a given arc current value, said system including a first electrode, a workpiece forming a second electrode separated from said first electrode by an arc space, a power source connected in series with the first electrode and the workpiece for supplying current to maintain an arc and means for cyclically increasing the arc current flowing between the first electrode and the workpiece to raise it to a level at which a desired property of the arc occurs, the said current-increasing means including a silicon controlled rectifier connected to operate as a switching device in series with the power source between the first electrode and the workpiece, and means applying to a control electrode of said silicon rectifier pulses to cause said rectifier to pass current at cyclically recurring intervals.

23. An electric arc system utilizing a non-linear effect of arc operation which occurs significantly only above a given arc current value, said system including a consumable first electrode, a workpiece forming a second electrode separated from said first electrode by an arc space, a power source, a first impedance connected in series with said power source to provide in said arc space an arc-maintaining current lower than the said value, a further impedance, and a switching device connected in series with the said further impedance, the switching device being arranged to operate cyclically to connect said further impedance in parallel with said first impedance whereby the said arc-maintaining current flowing through the first impedance, when the switching device is not operated, is supplemented, when the switching is operated, by current flowing through said further impedance to raise the total arc current higher than the said value, the values of the components of the system being such that the effective open circuit voltage of the power source substantially corresponds with the arc-voltage between the consumable electrode and the workpiece, the system further including means for feeding the consumable electrode towards the workpiece at a substantially constant rate which is independent of the said arc voltage.

24. An electric arc system utilizing a non-linear effect of arc operation which occurs significantly only above a given arc current value, said system including a consumable first electrode, a workpiece forming a second electrode separated from said first electrode by an arc space, a power source, a first impedance connected in series with said power source to provide in said arc space an arc-maintaining current lower than the said value, a further impedance, and a switching device connected in series with said further impedance, the switching device being arranged to operate cyclically to connect said further impedance in parallel with said first impedance whereby the said arc-maintaining current flowing through the first impedance, when the switching device is not operated, is supplemented, when the switching device is operated, by current flowing through said further impedance to raise the total arc current higher than the said value, the values of the components of the system being such that the effective open circuit voltage of the power source is considerably greater than the arc-voltage between the consumable electrode and the workpiece, the system further including means responsive to the magnitude of the said arc-voltage for feeding the consumable electrode towards the workpiece at a rate which is dependent on the said arc-voltage.

25. An electric arc system utilizing a non-linear effect of arc operation which is significant only above a given value of arc current, said system comprising in series a first electrode and a workpiece constituting a second electrode separated from said first electrode by an arc space, and current supply means connected to said electrodes, said current supply means comprising two parallel circuits including first and second impedances respectively and a switching device in series with said second impedance, said switching device operating cyclically to close and open said parallel circuit and thereby to provide sharp transitions in the value of arc current between a first value, lower than said given value, determined by said first impedance when said parallel circuit is open, and a second value, higher than the said given value, determined by said first and second impedances when said parallel circuit is closed.

26. An arc system utilizing a non-linear effect of arc operation which occurs significantly only above a given arc current value, said system including: a first electrode; a workpiece forming a second electrode separated from said first electrode by an arc space; a first power source; a second power source having an alternating current output; a first impedance connected in series with said first and second power sources, and said first and second electrodes to provide, in said arc space, an arc maintaining current; and a further impedance connected in series with said second power source and said first and second electrodes; whereby alternate half cycles of the current output of the second power source flowing through the said further impedance increase the current provided in the arc space through the first impedance from a first value below said given value to a second value above said given value.

References Cited by the Examiner

UNITED STATES PATENTS

| | | | |
|---|---|---|---|
| 2,026,943 | 1/1936 | Kennedy et al. | 219—137 |
| 2,139,160 | 12/1938 | Hebeler | 219—137 |
| 2,140,386 | 12/1938 | Jones | 219—131 |
| 2,951,972 | 9/1960 | Pomazal | 315—311 |

RICHARD M. WOOD, *Primary Examiner.*